Reissued May 30, 1939

Re. 21,099

UNITED STATES PATENT OFFICE 21,099

PROCESS FOR THE PRODUCTION OF A COLORED SOUND FILM

Béla Gaspar, Brussels, Belgium

Original No. 2,025,658, dated December 24, 1935, Serial No. 657,925, February 21, 1933. Application for reissue March 28, 1939, Serial No. 264,665. In Germany February 19, 1931

1 Claim. (Cl. 88—16.2)

Processes are already known in which colored sound films are reproduced, but their production is extraordinarily complicated. Moreover, it has hitherto been difficult to combine a colored picture and a black sound strip or track laid in different emulsions. The present process enables a colored sound picture and a black-and-white sound strip to be combined in one film strip in a simple and faultless manner. Several processes are known (see, for example, my prior Patents Nos. 1,956,122, 1,956,017, 1,985,344, 2,020,775, and 2,071,688, in which there is employed a silver halide material comprising a plurality of layers and having dyestuffs or dyestuff-forming substances incorporated therein, these substances being, after the production of the silver image in the said layers, converted into colored images. In carrying out the present invention in its preferred forms I employ the materials and the processes set out in my said prior patents. The said processes consist in forming the dyestuff image in a manner dependent upon the silver image by local formation of the dyestuff from dyestuff forming substances or by locally discharging the diffusely distributed dyestuff or dyestuff-forming substance at the image or non-image parts in proportion to the metallic deposit present, whereupon finally there is discharged the silver leaving a pure dyestuff.

The use of light-sensitive films having the requisite color substances already incorporated therein offers considerable advantages over the other known process of coloring the film subsequent to the formation of the silver image, because a much greater degree of certainty is obtained that the color substances are evenly distributed and, furthermore, the production of the colored image is materially facilitated. The term "color substances" as employed in this specification refers to all substances which are capable of supplying dyestuff images, i. e., both finished dyestuffs as well as dyestuff formers.

Now although the use of layers which already contain color substances prior to the exposure offers particular advantages in the production of colored images, certain difficulties have been encountered in producing a satisfactory sound record, as with similar treatment of the visual and sound record portions of a film the sound record would also be a colored one, and particular measures are necessary to obtain a black and white sound record in a film which contains the color substances at an initial stage. The drawing is a flow sheet diagrammatically illustrating the process.

In order to obtain a well-defined sound strip, it is necessary that it should be black-and-white, because the blackening curve is very difficult to reproduce free from distortion with a colored sound image; this difficulty occurs especially in the case of the so-called intensity process. For this purpose, according to the invention, only the picture portion of the film strip is converted into a colored picture whilst, at the position of the sound track, the conversion of the silver image into the dyestuff image is omitted. According to the invention, this is effected by the employment of a resist that prevents the penetration by chemical substances which would effect the conversion of the silver image into the dye image. This resist may consist of, for example, a layer of alcoholic varnish or of a fatty substance such as, for example, tallow or wax. It is, in addition possible to employ purely chemically active resist agents; for example, an oxidizing bath is employed for converting the silver picture into a dyestuff picture. In this case, a resist may be employed which consists of a thickening agent—e. g., gum arabic and sodium hydrosulphite, i. e., an agent that acts in a chemically opposite manner, in this case a reducing agent. Obviously, other chemically active resist agents may be employed for attaining the same object, but it is also possible to re-convert the already formed dyestuff image (consisting of dyestuff and silver salt) into a silver image with previous, subsequent or simultaneous destruction of the dyestuff if the following is applied at the position of the sound strip:—sodium hydrosulphite alone or with amidol. It is possible in the case of a colored sound picture at the place of the sound record which consists of a black silver band, to allow the dyestuff to remain by means of a local resist in all part of the layers, by protecting it before its destruction, or the following method may be adopted. The dyestuff is destroyed in, say, two layers so that only the third remains colored. The color that is chosen in the particular case is immaterial and only depends on the nature of the sensitivity of the photo-electric cell. A color may be selected which is suitable for the employment of invisible rays such as the ultra-violet and the infra-red rays.

What I claim and desire to secure by Letters Patent of the United States is:

The method of producing color kinematographic sound films wherein the picture is a color picture and wherein the sound record is a metallic silver image, which consists in forming in a pre-dyed photographic light-sensitive silver halide emulsion layer a developed and fixed silver image constituting a sound record and a silver image constituting a picture record, treating said records with an agent which locally destroys the dyestuff to convert each of the said records into a color image, converting the metallic silver in the visual and sound records into silver salt, treating the sound record only with a reducing substance to reconvert the silver salt into metallic silver, and thereafter dissolving the silver salt from the visual record portion by treating the film with a fixing bath.

BÉLA GASPAR.